United States Patent [19]

Unerdem

[11] Patent Number: 4,617,535
[45] Date of Patent: Oct. 14, 1986

[54] PSK DIGITAL ECHO MODULATOR WITH REDUCED MEMORY CAPACITY REQUIRED

[75] Inventor: M. Tarik Unerdem, Sunnyvale, Calif.

[73] Assignee: Exar Corporation, Sunnyvale, Calif.

[21] Appl. No.: 744,168

[22] Filed: Jun. 12, 1985

[51] Int. Cl.$^4$ ............................................... H03C 3/00
[52] U.S. Cl. ................................ 332/16 R; 332/23 R; 375/67
[58] Field of Search ............... 332/16 R, 23 R; 375/8, 375/9, 52, 53, 54, 55, 56, 57, 67

[56] References Cited

U.S. PATENT DOCUMENTS

| | | | |
|---|---|---|---|
| 3,787,785 | 1/1974 | Bass ................................... | 375/56 X |
| 3,988,540 | 10/1976 | Scott et al. ............................. | 375/53 |
| 4,008,373 | 2/1977 | Nash et al. ............................. | 375/53 |
| 4,238,779 | 12/1980 | Dickinson et al. ................... | 375/8 X |
| 4,295,105 | 10/1981 | Bingham .............................. | 332/9 R |
| 4,327,439 | 4/1982 | Gockler et al. .................... | 375/54 X |
| 4,504,802 | 3/1985 | Heatherington ............. | 332/16 R X |

Primary Examiner—Eugene R. LaRoche
Assistant Examiner—D. C. Mis
Attorney, Agent, or Firm—Townsend and Townsend

[57] ABSTRACT

An improved method and apparatus for reducing the amount of memory required to implement a digital echo modulator. A single permanent memory stores digital representations of a series of samples of a signal element for several phases of the signal element. A temporary memory is provided to store the digital representations from a plurality of signal elements to be overlapped. The signal element values are clocked out of the permanent memory and into the temporary memory at a rate, during each sampling interval, equal to the number of overlapping signal elements. The contents of the temporary memory are then provided to a summation circuit for producing a digital representation of the composite signal during that sampling interval. Phases of the signal element which are 180° out of phase with the stored phases are generated using two's complement circuitry.

16 Claims, 10 Drawing Figures

PSK DIGITAL ECHO MODULATOR WITH REDUCED MEMORY CAPACITY REQUIRED

BACKGROUND OF THE INVENTION

This invention relates to a method and apparatus for phase shift keying (PSK) modulation using digital echo modulation techniques.

In PSK modulation, a sine wave carrier signal of fixed frequency is used. Binary data values are encoded in changes in the phase of the carrier signal between signaling intervals. For differential phase shift keying (DPSK), the reference point from which the phase angle is measured at any signaling interval is the phase angle of the immediately previous interval. Thus, with DPSK the signal is self-referenced so that no separate absolute phase information needs to be transmitted. The DPSK encoding technique used in the Bell 212 modem encodes two bits (called a dibit) into one signaling element (baud). The values used are as follows:

| Dibit | Phase Change (Degrees) |
|-------|------------------------|
| 00    | 90°                    |
| 01    | 0°                     |
| 10    | 180°                   |
| 11    | 270°                   |

When PSK or DPSK is used, the change in phase between signaling elements can result in abrupt transitions in the signal, such as a 180° instantaneous change from a maximum positive value to a maximum negative value. This instantaneous change essentially makes the carrier signal a very high frequency signal for that short period of time. This high frequency component can cause problems for several reasons. For instance, in a typical telephone line frequencies above about 3000 Hz are attenuated by the impedance of the telephone line, and thus the usable bandwidth is only about 3000 Hz. Thus, high frequency components are lost in transmission and errors can result in the received signal. Alternately, two channels may be used for transmission, i.e., a 1200 Hz carrier signal for sending information in one direction and a 2400 Hz carrier signal for sending information in the other direction. High frequency components of the modulated 1200 Hz carrier signal could interfere with the 2400 Hz signal.

Figure 1A:
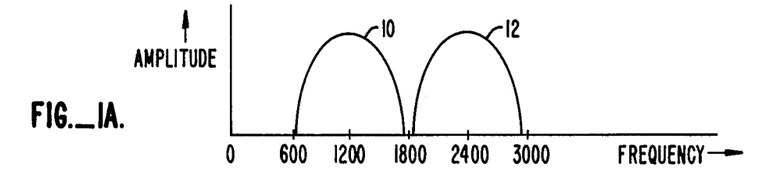
FIGS. 1A–1C are diagrams of the frequency spectrum and signal elements used in digital echo modulation.

FIG. 1 shows an example of two such channels in the 3000 Hz usable voice grade telephone channel. A first channel (band) 10 for transmission in one direction is centered at 1200 Hz and extends from approximately 600 Hz to 1800 Hz with a total bandwidth of 1200 Hz. A second channel 12 for transmission in the opposite direction is centered at 2400 Hz and extends from approximately 1800 Hz to 3000 Hz. It can be seen that if a high frequency component generated by modulating the 1200 Hz carrier falls within upper channel 12, interference will result. One technique used to reduce the high frequency components introduced by PSK is called digital echo modulation.

Digital echo modulation is described in a paper by Alain Crosier and Jean-Marc D. Pierret entitled "The Digital Echo Modulation," I.E.E.E. Transactions On Communication Technology, p. 367 (August, 1970). The technique for digitally implementing digital echo modulation is set forth in "Microcoded Modem Transmitters," M. F. Choquet and H. J. Nussbaumer, I.B.M. J. Res. Develop., p. 338 (July, 1974). A brief, simplified description of digital echo modulation as described in these references is set forth in the following paragraphs.

Basically, digital echo modulation is a technique used to produce a modulated carrier signal with few unwanted frequency components outside the transmission bandwidth. This is done by a combination of two interrelated techniques. First, a signal element representing a dibit is shaped so that substantially all of its frequency components are in the desired transmission band. Second, a number of signal elements are overlapped to smooth out transitions between signal elements.

The shaping of the signal element is done using Nyquist's telegraph theory. This shaping involves using a mathematical formula to form a composite signal from a series of frequencies in the desired frequency band. This composite signal is the Nyquist-type time-domain signal element shown in FIG. 1B. A 1200 Hertz signal 14 is shown within the Nyquist envelope 16. In addition to a primary component 18 of the signal element there are a number of echoes 20. The purpose of the echoes is to cancel the undesired frequency components of the primary component 18. The amplitude of the signal element trails off infinitely in both directions.

Figure 1B:
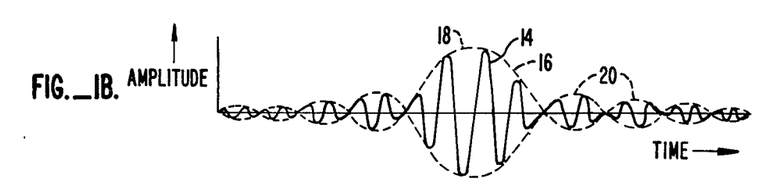
Figure 1C:
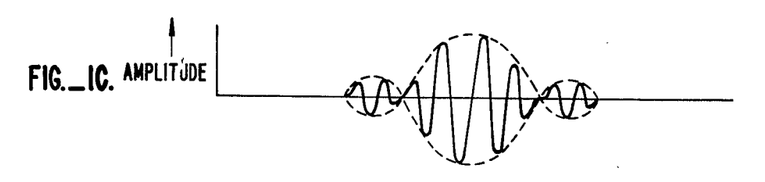

FIG. 1C shows the signal element of FIG. 1B with all but the primary echoes eliminated. The signal element of FIG. 1C is also modified so that when transferred back into the frequency domain, one of the original frequency bands of FIG. 1A will be closely approximated. The formula used to modify the signal element so that the element and only its first echoes will most closely give the desired frequency band is called a "window function."

Digital echo modulation involves digital generation of the signal element of FIG. 1C. Information is coded in these signal elements by changing the phase of the signal from one element to the next. However, this will result in abrupt changes between signal elements, introducing high frequency components into the transmitted signal. This undesirable feature is eliminated by using an overlapping technique as shown in FIG. 2.

Figure 2:
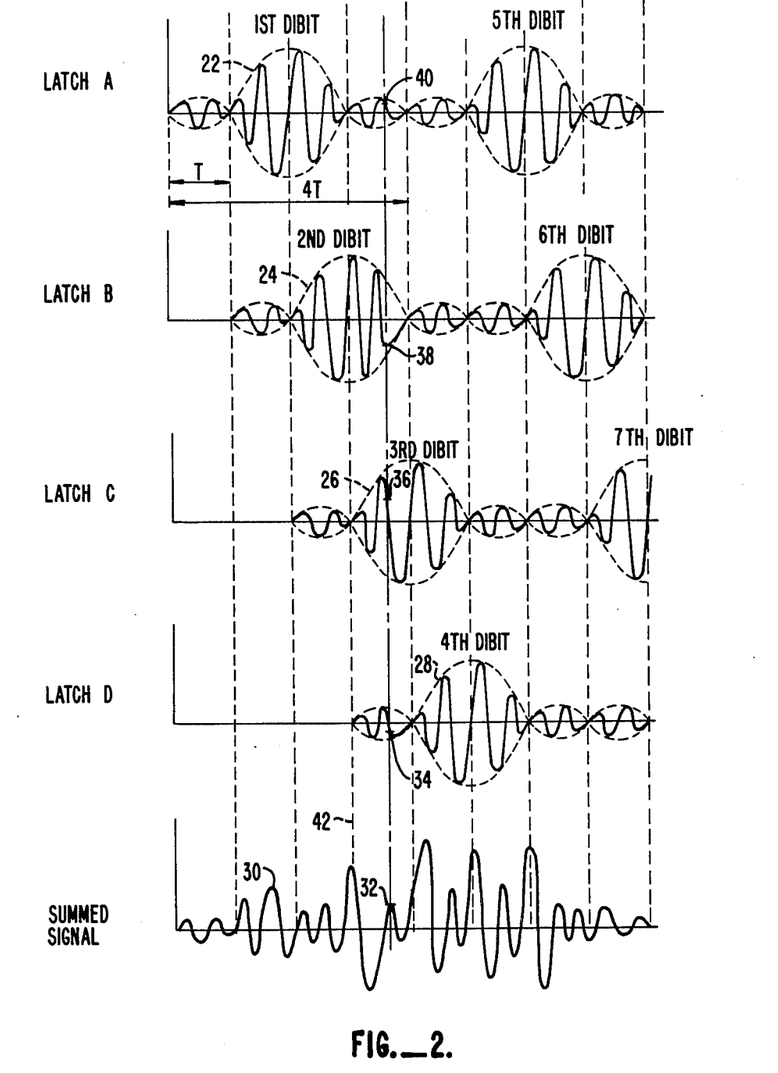
FIG. 2 is a diagram of several overlapping signal elements.

FIG. 2 shows four different signal elements 22, 24, 26, 28 representing a first through a fourth dibit, each extending for a period 4T. The four signal elements are overlapped by spacing each a period T from the preceding signal element. Each of the signal elements is represented digitally by taking a number of samples along its length. For example, signal element 22 may be represented by 64 digital samples. Each of the signal elements is digitally combined with the other signal elements to produce a composite signal 30. For instance, to produce a sample value 32 of composite signal 30, a negative value 34 of signal element 28 is combined with a positive value 36 of signal element 26, a negative value 38 of signal element 24 and a positive value 40 of signal element 22. Other points of composite signal 30 are similarly generated.

Composite signal 30 will have smooth transitions from one element to the next due to the overlapping effect. However, the overlapping does not reduce the integrity of the data since phase shift information is determined from the state of the signal at the center of each signal element. As can be seen from FIG. 2, at the point where the Nyquist envelope of each signal element peaks, the remaining overlapping signal elements all have a null. For instance, at the time indicated by dotted line 42, signal element 24 alone determines the state of composite signal 30 because the other three signal elements are at zero at this point. This will also be true for signal elements which are phase-shifted by a multiple of 90°. Thus, only the desired signal element will be produced in the composite signal at that instant in time corresponding to the end of a period T.

Figure 3:
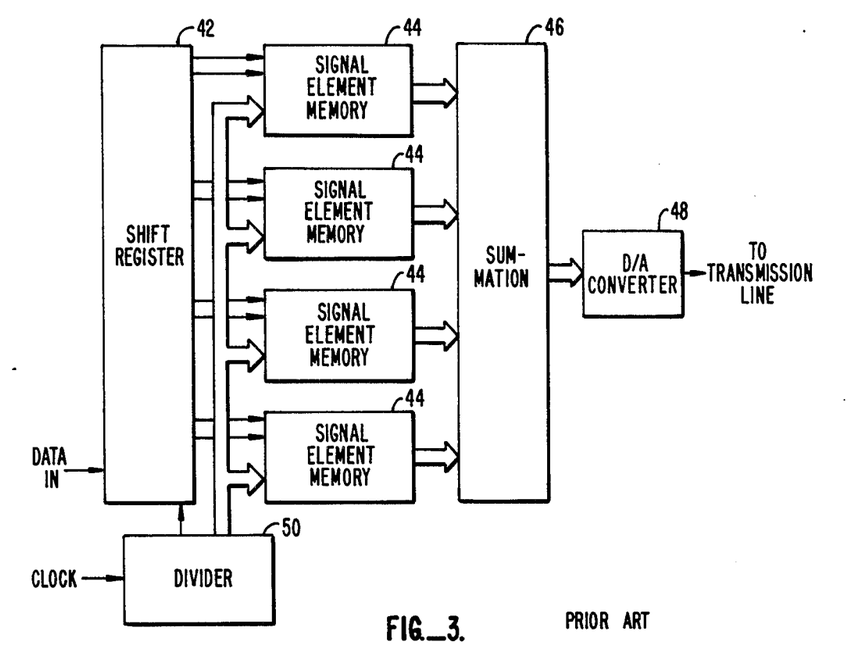
FIG. 3 is a schematic diagram of a prior art digital echo modulator.

FIG. 3 shows a modulator for implementation of digital echo modulation. The data is input to a shift register 42 and from there proceeds to a number of signal element memories 44. Each signal element memory stores a digital representation of each of the desired phases of the signal. If four phases are used for each of two channels and each signal element is represented by 64 samples of 6 bits each, four 6×512 memories are required. The outputs of memories 44 are provided to a summation circuit 46 which produces a composite signal. The composite signal is processed through digital to analog converter 48 to produce an output signal.

A divider 50 operates to produce addresses to cause memories 44 to produce a digital amplitude at each of the sample points for a given signal element. The signal element is designated by the data in shift register 18 which is input to two address lines of a memory 44. After divider 50 causes all the samples of a signal element to be produced, shift register 42 will shift the data up and the divider will then again run through the addresses to produce the samples of each signal element. Thus, at any one time four overlapping signal elements are summed.

For implementation in an integrated circuit it is desirable to reduce the amount of required circuitry for the modulator. In particular, it would be desirable to reduce the memory required, because the memory circuits occupy a large amount of space due to the large number of signal element representations required.

SUMMARY OF THE INVENTION

The present invention is an improved method and apparatus for reducing the amount of memory required to implement a digital echo modulator. A single permanent memory stores digital representations of a series of samples of a signal element for several phases of the signal element. A temporary memory is provided to store the digital representations from a plurality of signal elements to be overlapped. The signal element values are clocked out of the permanent memory and into the temporary memory at a rate, during each sampling interval, equal to the number of overlapping signal elements. The contents of the temporary memory are then provided to a summation circuit for producing a digital representation of the composite signal during that sampling interval.

If four signal elements are to be overlapped in each period, the temporary memory can consist of four latches, each coupled to store the digital representation of a separate signal element. During each sampling interval, a representation of the sample value of each signal element is clocked out of the permanent memory and into the appropriate latch. All of the latches are then clocked to a summation circuit for producing a composite signal during the sampling interval. Where a four phase system is used, the amount of permanent memory is further reduced by storing only two of the four phases. Each signal element is represented so that the representation is centered about the center of the digital range. The phases which are 180° from the stored phases can then be produced by calculating the two's complement value of the stored phases. This calculation essentially inverts the stored signal element, thus producing a signal element out of phase with the stored signal element by 180°.

The values for the four signal elements can be produced by storing the four dibits representing the four signal elements to be overlapped in separate latches and alternately coupling the latches to the appropriate input address of the permanent memory. One of the addresses controlled by such latches would be coupled to enable a multiplexer which chooses between the output of the permanent memory and the two's complement circuitry coupled to the permanent memory. The output of the multiplexer is then coupled to the temporary memory.

The present invention thus results in a severalfold decrease in the amount of memory required for digital echo modulation by both the use of a temporary memory and the use of two's complement circuitry. For a fuller understanding of the nature and advantages of the invention, reference should be made to the ensuing detailed description taken in conjunction with the accompanying drawings.

DETAILED DESCRIPTION OF THE PREFERRED EMBODIMENT

Figure 4:
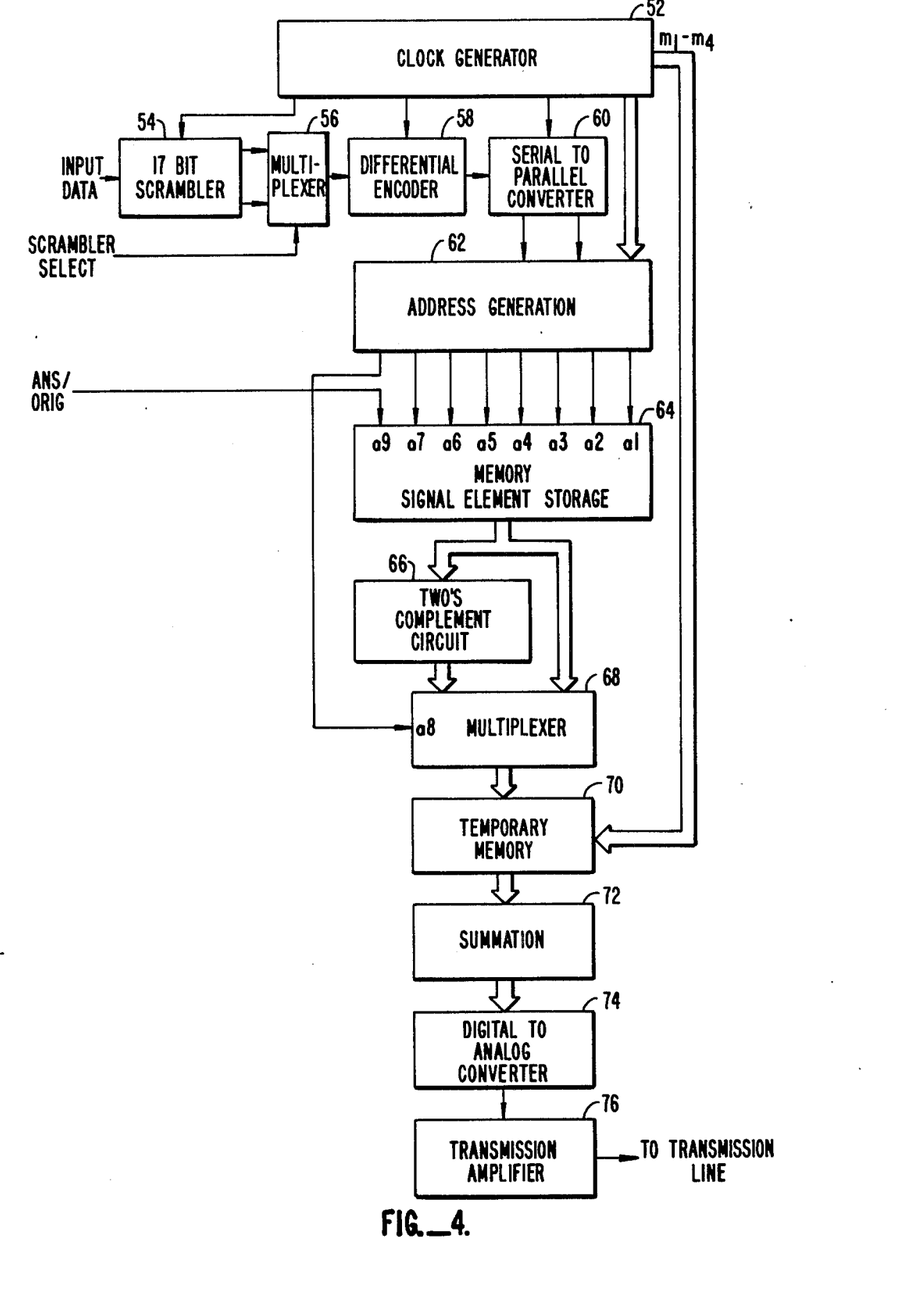
FIG. 4 is a schematic diagram of a preferred embodiment of the present invention.

FIG. 4 shows the preferred embodiment of a digital echo modulator in accordance with the present invention. A clock generator 52 provides clocking signals for the circuit. The input data to be transmitted is processed through a scrambler 54, a multiplexer 56, a differential encoder 58, and a serial to parallel converter 60. The data is then provided to an address generation circuit 62 along with a clocking signal from clock generator 52. Address generation circuit 62 provides the addresses for a permanent signal element memory 64. Memory 64 stores 64 digital samples of the 0° and 90° signal elements calculated from the responses of the square-root raised-cosine frequency spectra. The Kaiser window function is used to generate the signal elements. The output of memory 64 is provided by two's complement circuit 66. The outputs of memory 64 and two's complement circuit 66 are provided to a multiplexer 68, which is enabled by an address $a_8$ from address generation circuit 62. The output of multiplexer 68 will be either a value from memory 64 or its two's complement, depending on the state of address $a_8$. The output of multiplexer 68 is provided to a temporary memory 70. The output of temporary memory 70 is provided to a summation circuit 72 and from there to a digital to analog (D/A) converter 74. The output of D/A converter 74 is processed through transmission amplifier 76 and then provided to the transmission line.

Scrambler 54 scrambles the input data in a conventional manner in accordance with a predefined formula so that a sufficient number of transitions from zero to one and vice versa are provided to enable the data to be recovered at the demodulator. Since the receiver clock in a demodulator is derived from the received data, that data must contain enough changes from 0 to 1 (and vice versa) to assure that the timing recovery circuit will stay in synchronization. If the data contains a long string of 1's (or 0's), the data will not provide the receiver with enough transitions for synchronization. Scrambler 54 prevents this condition by changing the input bit stream in a controlled way. The scrambler can be implemented in a conventional way using shift registers with multipath feedback.

A scrambler also increases the error rate in the received data. Therefore, a scrambler select input to multiplexer 56 allows a user to choose whether or not to use scrambled data. A conventional differential encoder 58 is utilized because the data, which consists of a series of dibits (00, 01, 10, 11), is encoded into relative phase changes between signal elements rather than an absolute phase of a signal element for a Bell 212 compatible modem. Thus, differential encoder 58 compares a present dibit with a preceding dibit and produces a dibit representative of the change in phase from the preceding dibit. Serial to parallel converter 60 provides a parallel presentation of each dibit to address generation circuit 62.

Figure 5:
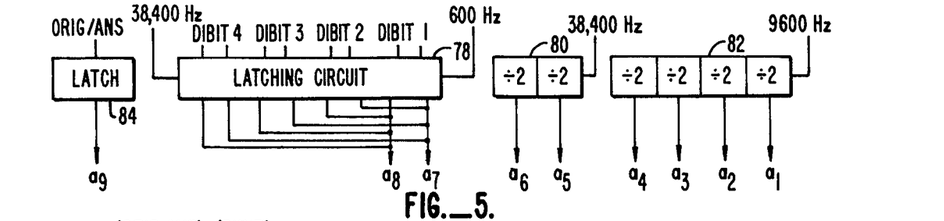
FIG. 5 is a schematic diagram of the address generation of circuit of FIG. 4.

Address generation circuit 62 of FIG. 4 is shown in more detail in FIG. 5. The address generation circuit of FIG. 5 provides addresses for sixty-four samples of each signal element. Each sample is represented by a six-bit binary number. Each signal element produced will have a duration of 1/150 second, which equals four periods T of 1/600 second. Four dibits are stored in a latching circuit 78 for a period T. Each dibit is sequentially coupled to address lines $a_8$ and $a_7$ during a sampling interval by a 38,400 Hz signal. As each dibit is switched, address lines $a_5$, $a_6$ from divider circuit 80 are also switched by the 38,400 Hz clock to give the overlapping of the dibits by giving samples which are at a position corresponding to periods T, 2T, and 3T from the first sample. During each sampling interval, a 9600 Hz signal produces an appropriate output of a divider circuit 82 for address lines $a_1$–$a_4$. Thus, while a fixed digital value is represented on address lines $a_1$–$a_4$, latching circuit 78 will alternate through four versions of $a_7$ and $a_8$, representing two different memory locations and the two's complement version of such memory outputs for phase changes which are 180° from the stored phases (180°, 270°).

An address $a_9$ from a latch 84 is used to select one of two segments of memory 64 of FIG. 4. This address is used to indicate whether the modulator is in the answer mode, which uses a 2400 Hz carrier, or an originate mode, which uses a 1200 Hz carrier. This Orig./Ans. control signal is supplied to the modulator along with the data. One segment of memory 64 stores the digital representation of the 1200 Hz signal elements for 0° and 90°, while the other memory segment stores the digital representation of the 2400 Hz signal elements for 0° and 90°.

Figure 5A:
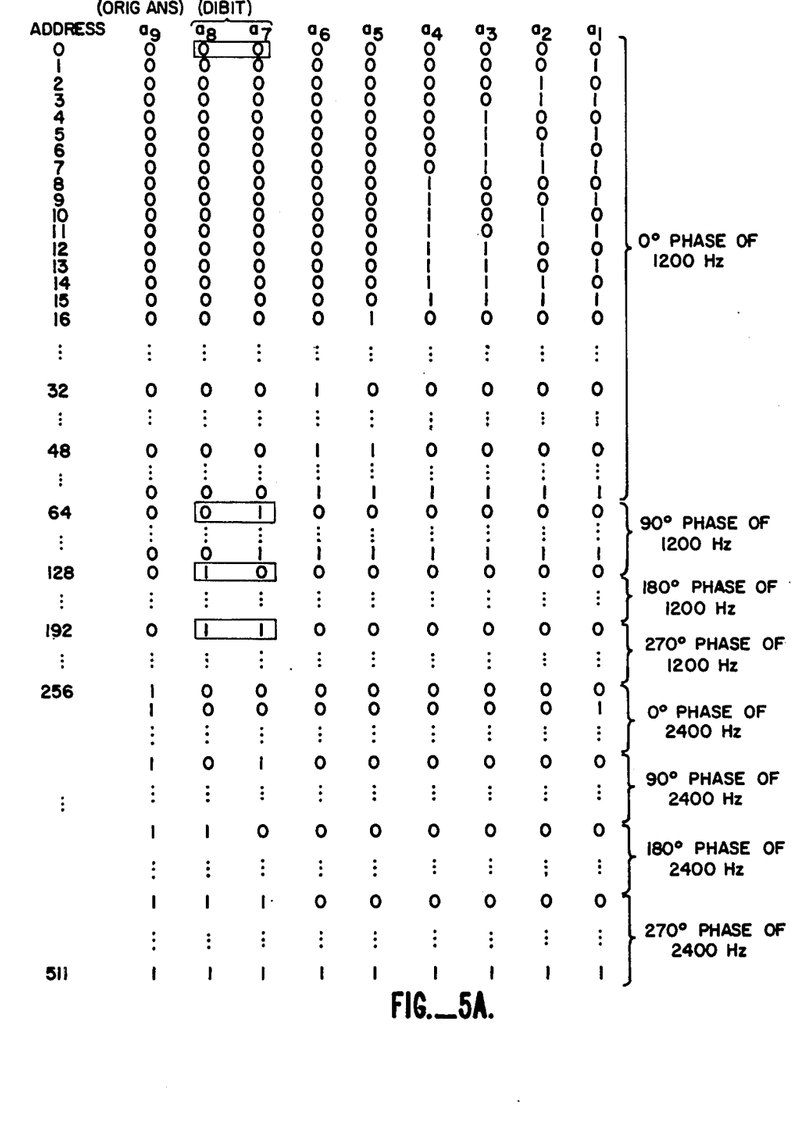
FIG. 5A is a table of the addresses produced by the circuit of FIG. 5.

The addresses generated by the circuit of FIG. 5 are shown in FIG. 5A. In operation, to produce a first sample of composite signal 30 of FIG. 2, address lines $a_1$–$a_4$ are all zero and dibit 1 is output from latching circuit 78 of FIG. 5 to address lines $a_7$ and $a_8$ by the 38,400 Hz clock signal. If dibit 1 is 0,0 and address lines $a_5$, $a_6$ are 0,0, the six-bit sample value stored at memory address 0 is clocked out at memory 64, through multiplexer 68 and into temporary memory 70 by clock signal $m_1$. Addresses $a_1$–$a_4$ remain fixed as the next three dibits are supplied to address lines $a_7$, $a_8$ and the six-bit sample values are clocked into temporary memory 70 by clock signals $m_2$–$m_4$. Address lines $a_5$, $a_6$ change in conjunction with each dibit change to produce the overlapping effect. Thus, the first dibit will start sampling at point 0, the second dibit at a point corresponding to a period T later, and so on, to produce the overlap shown in FIG. 2.

The four six-bit sample values in temporary 70 are added in summation circuit 72 to produce a single six-bit composite value. Addresses $a_1$–$a_4$ are then changed from 0000 to 0001 by the 9600 Hz clock signal and the process is repeated. After the requisite number of samples corresponding to a time T are produced, the 600 Hz clock signal to latching circuit 78 clocks in a new dibit and rotates the first three dibits down one position. At this point, the last dibit has been rotated through all four positions corresponding to a period 4T, and thus has been completely produced.

Figure 6:
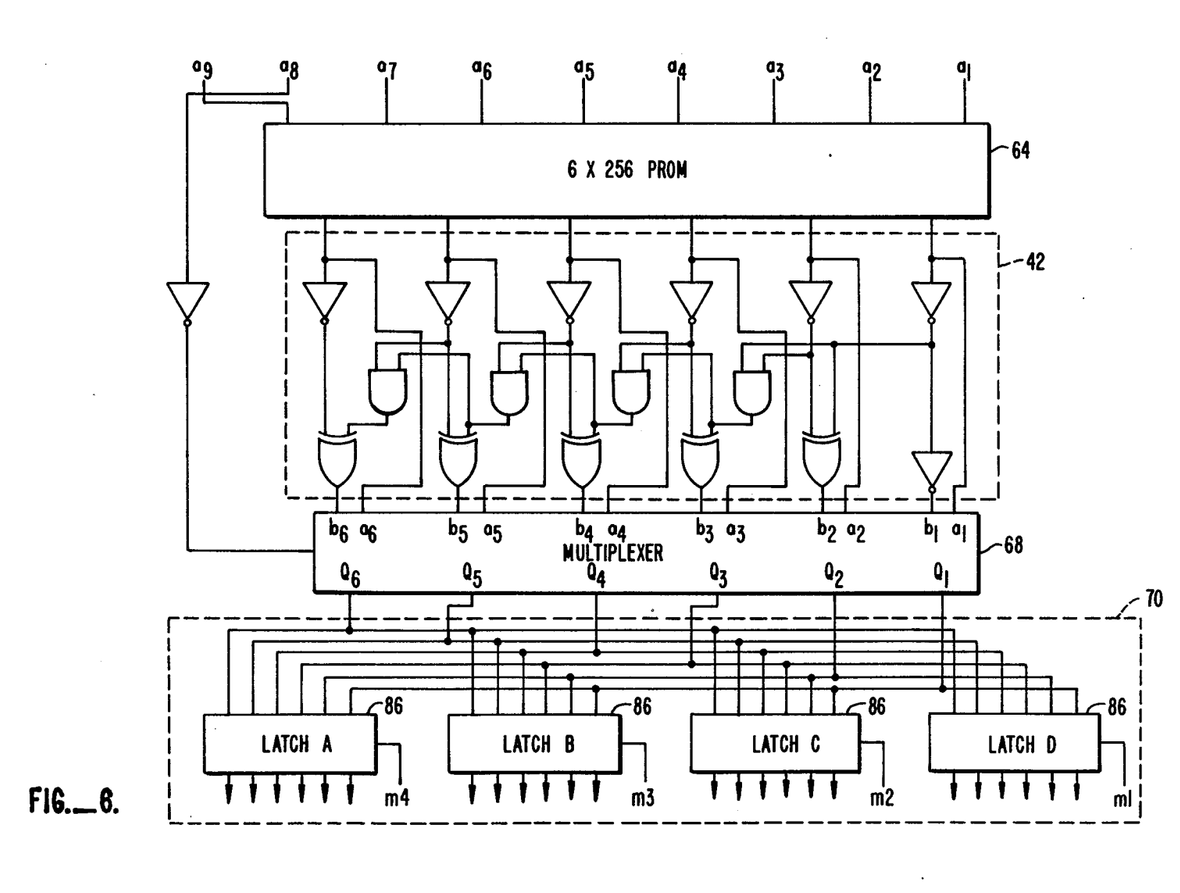
FIG. 6 is a schematic diagram of the temporary memory and two's complement circuit of FIG. 4.

The temporary memory 70 and two's complement circuit 66 of FIG. 4 are shown in more detail in FIG. 6. A 6 bit × 256 word Programmable Read Only Memory (PROM) 64 is the permanent memory. The output of PROM 64 is coupled through two's complement circuit 66 composed of a number of inverters, AND gates, and exclusive OR gates. Both the outputs of PROM 64 and the outputs of two's complement circuitry 66 are coupled to a multiplexer 68. Multiplexer 68 determines whether the PROM output or the two's complement of the PROM output will be provided to a series of latches 86. Multiplexer 68 is controlled by address $a_8$, as described with reference to the address generation circuit of FIG. 5.

During each sample interval, four sample values are generated. Each sample is either an output of PROM 64 or the two's complement of such output. Each of these outputs is coupled to a respective one of latches 86 by clock signals $m_1$–$m_4$ from clock generator 52 of FIG. 4. Each clock signal $m_1$–$m_4$ provides an enabling pulse to its respective latch once during a sampling interval, so that one of the latches 86 is always enabled in conjunction with the 38,400 Hz clock signal. The outputs of latches 86 are clocked to the summation circuit 72 of FIG. 4 once during each sampling interval to produce an instantaneous value of the composite signal for transmission. Summation circuit 72 is a 24 inputs 6 outputs device which produces a six-bit signal which is the sum of the four six-bit inputs.

Figure 7:
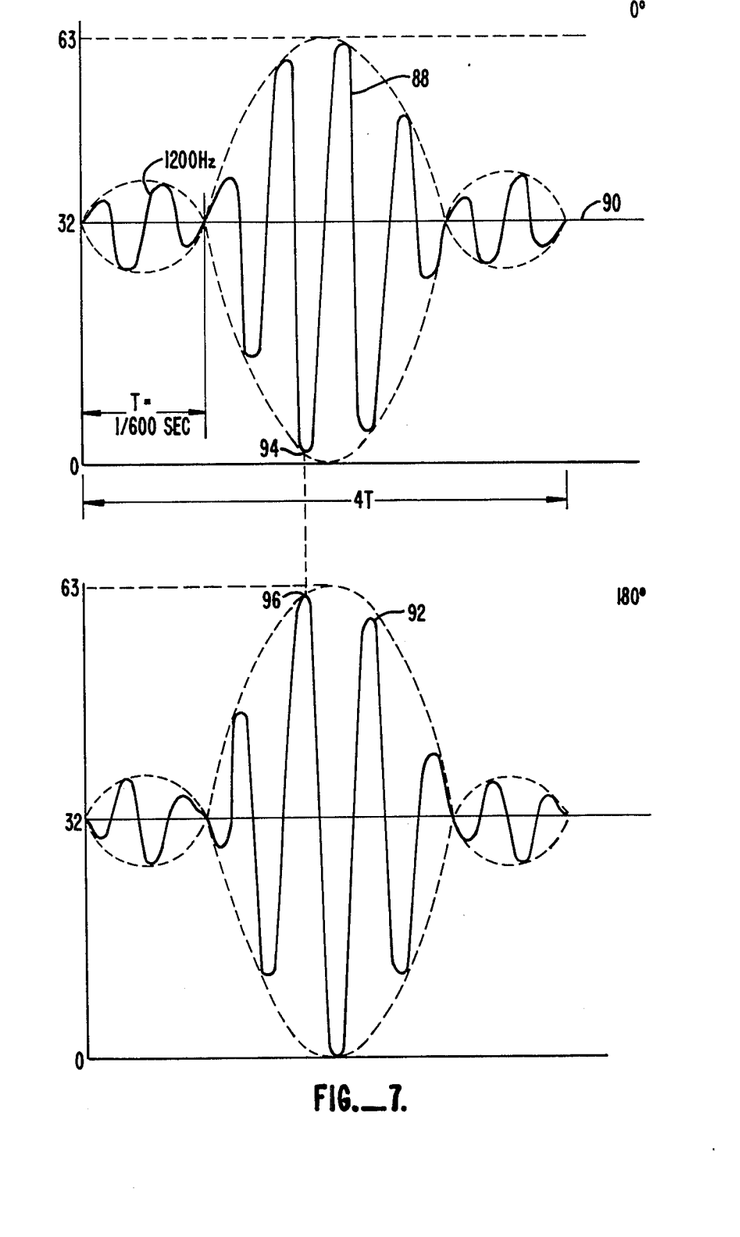
FIG. 7 is a diagram of a signal element of the present invention.

The signal produced by the two's complement circuit can be seen in FIG. 7. A signal element 88 representing 0° phase for a 1200 Hz signal is shown. The center 90 of the signal element is centered at the midpoint of the digital range (0–63) of memory 64, which for six bits is the binary value corresponding to 31. By so centering the signal element, it is possible to produce a signal element 92 which is 180° out of phase by simply inverting signal element 88. This inversion is accomplished by taking the two's complement of the digital representation of each sample value of signal 88. For instance, if a sample at point 94 of signal element 88 has a digital value of five, the two's complement of the binary representation of five will generate a binary value representing 58 (max. range 63–5), which would correspond to the amplitude shown at point 96, thereby producing the corresponding portion of signal element 92.

As can be seen with reference to FIG. 6, the amount of circuitry required to produce the two's complement value is significantly less than the amount of memory which would be required to represent such a value in the first instance. By using a temporary memory, the amount of permanent memory required is one-fourth of that of the prior art circuit of FIG. 3. Only a single 512 word PROM is required, rather than the four 512 word PROMs of FIG. 3. The amount of temporary memory is insignificant by comparison since it only has to store four 6-bit samples (four words). The use of the two's complement circuitry further reduces the required permanent memory by one-half, so that only a 256 word PROM is required.

As will be understood by those familar with the art, the present invention may be embodied in other specific forms without departing from the spirit or essential characteristics thereof. For example, more or less samples could be used or more or less bits to represent each sample could be used. Accordingly, the disclosure of the preferred embodiment of the present invention is intended to be illustrative, but not limiting, of the scope of the invention which is set forth in the following claims.

What is claimed is:

1. In a modulator for producing a composite transmission signal corresponding to a plurality of overlapping signal elements, each signal element corresponding to an element of data, and having a permanent memory for storing a multiplicity of digital representations of instantaneous values of amplitudes of each said signal element at a plurality of positions corresponding to sampling time intervals along said signal elements, the improvement comprising;
   temporary memory means for storing a selected plurality of said multiplicity of digital representations of instantaneous signal element values, each of said selected plurality corresponding to a separate one of said signal elements during a single sampling time interval; and
   means for adding said selected plurality of values from said temporary memory to produce a digital representation of the instantaneous value of said composite signal in a single add operation during said single sampling time interval.

2. The apparatus of claim 1 wherein said modulator is a digital echo modulator.

3. The modulator of claim 1 wherein a zero amplitude level of a first one of said signal elements is represented by a digital value at the midpoint of the range of values of said digital values stored in said permanent memory and wherein said modulator further includes means for generating a second signal element having a phase shift of 180° relative to said first signal element by calculating the two's complement of each digital representation of an instantaneous value of said first signal element.

4. The modulator of claim 3 further comprising multiplexer means, coupled to said permanent memory and said two's complement signal generating means, for alternatively coupling a digital representation of an instantaneous value of said first and second signal elements to an output of said multiplexer means, said temporary memory means including at least two latch means, coupled to said output of said multiplexer means, for storing digital representations of an instantaneous value of said first and second signal elements.

5. The modulator of claim 4 wherein digital representations of the instantaneous value of four signal elements are generated during each sampling interval, said four signal elements being selected from a first two signal elements stored in said permanent memory and a second two signal elements generated from said first two signal elements by said two's complement signal generating means.

6. The modulator of claim 5 wherein each signal element extends for a specified time period and each succeeding signal element commences at a time ¼ of said time period after a preceding signal element commences.

7. The modulator of claim 1 wherein each of said digital representations of an instantaneous value of a signal element consists of six binary bits.

8. A digital echo modulator for producing a composite transmission signal corresponding to a plurality of overlapping signal elements, each signal element corresponding to an element of data, comprising:
   a permanent memory for storing a multiplicity of digital representations of instantaneous values of amplitudes of at least a first one of said signal elements at a plurality of positions corresponding to sampling time intervals along said signal elements, a zero amplitude level of said first signal element being represented by a digital value at the midpoint of the range of values of said digital values stored in said permanent memory;
   means for generating a second signal element having a phase shift of 180° relative to said first signal element by calculating the two's complement of each digital representation of an instantaneous value of said first signal element;
   multiplexer means, coupled to said permanent memory and said two's complement signal generating means, for alternatively coupling a digital representation of an instantaneous value of said first and second signal elements to an output of said multiplexer means during a single sampling time interval;
   at least two latch means, coupled to said multiplexer output, for storing said digital representations of an instantaneous value of said first and second signal elements; and
   means for adding said digital representations from said latch means to produce a digital representation of the instantaneous value of said composite signal in a single add operation during said single sampling time interval.

9. The modulator of claim 8 further comprising differential encoder means for generating an address of said permanent memory corresponding to a phase of one of said signal elements, said phase being determined from a phase change corresponding to the difference between one of said elements of data and a preceding element of data.

10. The modulator of claim 8 further comprising address generating means for producing addresses of said permanent memory corresponding to a stored signal element and for producing a signal to control said multiplexer means.

11. A method for producing a composite transmission signal corresponding to a plurality of overlapping signal elements, each signal element corresponding to an element of data, comprising:

providing a permanent memory for storing a multiplicity of digital representations of instantaneous values of amplitudes of each said signal element at a plurality of positions corresponding to sampling time intervals along each said signal element;

storing a selected plurality of said digital representations of instantaneous signal element values in a temporary memory, each digital representation corresponding to a separate one of said signal elements during a single sampling time interval;

transferring said selected plurality of values from said permanent memory to said temporary memory during said single sampling time interval; and adding said plurality of values from said temporary memory to produce a digital representation of the instantaneous value of said composite signal in a single add operation during said single sampling time interval.

12. The method of claim 11 wherein said signal elements are used for digital echo modulation.

13. The method of claim 11 wherein a zero amplitude level of a first one of said signal elements is represented by a digital value at the midpoint of the range of values of said digital values stored in said permanent memory and further including the step of generating a second signal element having a phase shift of 180° relative to said first signal element by calculating the two's complement of each digital representation of an instantaneous value of said first signal element.

14. The method of claim 13 wherein said temporary memory comprises at least two latches and further including the step of alternatively coupling a digital representation of an instantaneous value of said first and second signal elements to an output of a multiplexer.

15. The method of claim 13 further including the step of generating digital representations of the instantaneous value of a third and a fourth signal elements during said single sampling time interval, said third signal elements being selected from said permanent memory and said fourth signal element being generated from said third signal element by said two's complement signal generating step.

16. The method of claim 15 wherein each signal element extends for a specified time period and each succeeding signal element commences at a time ¼ of said time period after a preceding signal element commences.

* * * * *